US009185684B2

(12) United States Patent
Cai et al.

(10) Patent No.: US 9,185,684 B2
(45) Date of Patent: *Nov. 10, 2015

(54) USING NON-UNIFORM FREQUENCY BANDS FOR COEXISTENCE AMONG MULTIPLE WIRELESS COMMUNICATION TECHNOLOGIES

(75) Inventors: Ying Cai, Campbell, CA (US); Jihwan P. Choi, San Jose, CA (US); Hui-Ling Lou, Sunnyvale, CA (US); Vladan Petrovic, San Jose, CA (US)

(73) Assignee: MARVELL WORLD TRADE LTD, St. Michael (BB)

( * ) Notice: Subject to any disclaimer, the term of this patent is extended or adjusted under 35 U.S.C. 154(b) by 27 days.

This patent is subject to a terminal disclaimer.

(21) Appl. No.: 13/605,241

(22) Filed: Sep. 6, 2012

(65) Prior Publication Data

US 2013/0065638 A1 Mar. 14, 2013

Related U.S. Application Data

(60) Provisional application No. 61/534,657, filed on Sep. 14, 2011.

(51) Int. Cl.
*H04W 72/02* (2009.01)
*H04W 72/04* (2009.01)
*H04W 88/06* (2009.01)

(52) U.S. Cl.
CPC .......... *H04W 72/02* (2013.01); *H04W 72/0453* (2013.01); *H04W 88/06* (2013.01)

(58) Field of Classification Search
CPC ... H04W 16/14; H04W 28/048; H04W 72/02; H04W 72/0453; H04W 72/048; H04W 72/082; H04W 72/1215; H04W 84/12; H04W 88/06; H04B 1/0475; H04B 1/10; H04B 1/38; H04B 1/406; H04B 1/69; H04B 1/715; H04B 15/00; H04B 2215/00; H04B 2215/068
USPC .................. 455/63.1, 114.2, 278.1, 296, 405, 455/418–420, 423, 436–444, 450–453, 464, 455/552.1–553.1; 370/230–235, 252, 331, 370/437, 465; 375/225
See application file for complete search history.

(56) References Cited

U.S. PATENT DOCUMENTS 4,837,576 A 6/1989 Schwarz
8,335,204 B2 12/2012 Samarasooriya et al.
(Continued)

FOREIGN PATENT DOCUMENTS

CN 101433124 A 5/2009
CN 101449472 A 6/2009
(Continued)

OTHER PUBLICATIONS

"3rd Generation Partnership Project; Technical Specification Group Radio Access Networks; Evolved Universal Terrestrial Radio Access (E-UTRA); Study on signalling and procedure for intereference avoidance for in-device coexistence; (Release 10)", 3GPP Standard; 3GPP TR 36.816, 3rd Generation Partnership Project (3GPP), Mobile Competence Centre; 650, Route Des Lucioles; F-06921 Sophia-Antipolis Cedex; France. vol. RAN WG2, No. v2.0.0, Jun. 8, 2011, pp. 1-40, XP050552922.

(Continued)

*Primary Examiner* — Michael Mapa

(57) ABSTRACT

Apparatus having corresponding methods and computer-readable media comprise: a first transceiver comprising a controller configured to select one of a plurality of frequency regions, wherein bandwidths of the frequency regions are non-uniform, and wherein the first transceiver is configured to transceive, according to a first protocol, first wireless signals in the one of the plurality of frequency regions selected by the controller; an arbiter configured to select one or more frequency channels based on the one of the plurality of the frequency regions selected by the controller; and a second transceiver configured to transceive, according to a second protocol, second wireless signals only in the one or more frequency channels selected by the arbiter.

18 Claims, 5 Drawing Sheets

(56) References Cited

U.S. PATENT DOCUMENTS

| | | | |
|---|---|---|---|
| 8,379,671 | B2 | 2/2013 | Chen et al. |
| 8,514,796 | B2 | 8/2013 | Kowalski et al. |
| 2003/0060206 | A1 | 3/2003 | Sointula et al. |
| 2009/0143095 | A1 | 6/2009 | Zhang |
| 2011/0105027 | A1 | 5/2011 | Linsky |
| 2011/0116490 | A1* | 5/2011 | Wilhelmsson et al. ....... 370/343 |
| 2011/0153818 | A1* | 6/2011 | Vandwalle et al. ........... 709/224 |
| 2011/0158339 | A1 | 6/2011 | Tuttle et al. |
| 2011/0237246 | A1* | 9/2011 | Sen ............................. 455/426.1 |
| 2011/0312288 | A1* | 12/2011 | Fu et al. ........................... 455/88 |
| 2012/0129457 | A1* | 5/2012 | Linsky .......................... 455/63.3 |
| 2012/0213162 | A1* | 8/2012 | Koo et al. ...................... 370/329 |
| 2013/0072209 | A1* | 3/2013 | Haartsen .................... 455/452.1 |

FOREIGN PATENT DOCUMENTS

| | | |
|---|---|---|
| CN | 101663838 A | 3/2010 |
| EP | 1463365 A2 | 9/2004 |
| WO | WO-2006053951 A1 | 5/2006 |

OTHER PUBLICATIONS

IEEE Standard 802.15.2-2003; IEEE Computer Society; IEEE Recommended Practice for Information technology—Telecommunications and information exchange between systems—Local and metropolitan area networks—Part 15.2: Coexistence of Wireless Personal Area Networks with Other Wireless Devices Operating in Unlicensed Frequency Bands; Aug. 28, 2003; 126 pages.

Notification of Transmittal of the International Search Report and the Written Opinion of the International Searching Authority for PCT/US2012/055076 filed Sep. 13, 2012; dated Nov. 5, 2012; 13 pages.

ZTE: "Further analysis on in-device coexistence intereference avoidance solutions", 3GPP Draft; R2-105361 Further Analysis on In-Device Coexistence Intereference $3^{rd}$ Generation Partnership Project (3GPP), Mobile Competence Centre; 650, Route Des Lucioles; F-06921 Sofia-Antipolis Cedex; France, vol. RAN WG2, No. Xi'an; Oct. 11, 2010, (Oct. 3, 2010), XP050452409.

ZTE: "Modelling of interference avoidance for in-device coexistence", 3GPP Draft; R2-104640 Modelling of Interference Avoidance for In-Device Coexistence, $3^{rd}$ Generation Partnership Project (3GPP), Mobile Competence Centre; 650, Route Des Lucioles; F-06921 Sofia-Antipolis Cedex; France, vol. RAN WG2, No. Madrid, Spain; Aug. 23, 2010, (Aug. 17, 2010), XP050451907.

PCT International Search Report for corresponding International Application No. PCT/US2012/055082; Jan. 3, 2013; 5 pages.

First Office Action received on Feb. 10, 2015 for Chinese Patent Application No. 201280052896.7, 5 pages.

* cited by examiner

USING NON-UNIFORM FREQUENCY BANDS FOR COEXISTENCE AMONG MULTIPLE WIRELESS COMMUNICATION TECHNOLOGIES

CROSS-REFERENCE TO RELATED APPLICATION

This disclosure claims the benefit of U.S. Provisional Patent Application Ser. No. 61/534,657, filed on Sep. 14, 2011, entitled "Non-uniform Frequency Operation Region for In-device Co-existence Interference Avoidance," the disclosure thereof incorporated by reference herein in its entirety.

FIELD

The present disclosure relates generally to the field of wireless communication. More particularly, the present disclosure relates to avoiding interference between different wireless communication technologies that use adjacent or overlapping frequency bands.

BACKGROUND

The popularity of multiple wireless communication technologies for handheld platforms has created a need to integrate multiple wireless communication technologies on a single wireless communication device. However, the frequency bands of some of these technologies are close enough to result in interference. For example, the un-licensed 2.4 GHz Industrial, Scientific and Medical (ISM) frequency band is adjacent to some of the bands used by Mobile Wireless Standards (MWS) technologies to result in adjacent channel interference. In many electronic devices such as smartphones, both ISM and MWS technologies are implemented in the same device. For example, a smartphone may employ LTE (Long Term Evolution) for phone calls, WiFi for local area networking, and Bluetooth for headsets. LTE transmissions from the smartphone will cause adjacent channel interference with incoming Bluetooth and WiFi signals. Similarly, Bluetooth and WiFi transmissions from the smartphone will cause adjacent channel interference with incoming LTE signals. This adjacent channel interference can significantly degrade performance not only at the smartphone, but also at connected MWS base stations.

SUMMARY

In general, in one aspect, an embodiment features an apparatus comprising: a first transceiver comprising a controller configured to select one of a plurality of frequency regions, wherein bandwidths of the frequency regions are non-uniform, and wherein the first transceiver is configured to transceive, according to a first protocol, first wireless signals in the one of the plurality of frequency regions selected by the controller; an arbiter configured to select one or more frequency channels based on the one of the plurality of the frequency regions selected by the controller; and a second transceiver configured to transceive, according to a second protocol, second wireless signals only in the one or more frequency channels selected by the arbiter.

Embodiments of the apparatus can include one or more of the following features. In some embodiments, the first protocol is a Mobile Wireless Standards (MWS) protocol; and the second protocol is an Industrial, Scientific and Medical (ISM) band protocol. In some embodiments, the first protocol is an Industrial, Scientific and Medical (ISM) band protocol; and the second protocol is a Mobile Wireless Standards (MWS) protocol. In some embodiments, each of the first protocol and the second protocol is an Industrial, Scientific and Medical (ISM) band protocol. In some embodiments, one of the frequency regions includes a plurality of frequency sub-regions; the controller is further configured to select one of the plurality of the frequency sub-regions; the first transceiver is further configured to transceive the first wireless signals in the one of the plurality of the frequency sub-regions selected by the controller; and the arbiter is further configured to select the one or more frequency channels based on the one of the plurality of the frequency sub-regions selected by the controller. In some embodiments, the controller is further configured to provide an information signal, wherein the information signal indicates the one of the plurality of the frequency regions selected by the controller; and the arbiter is further configured to select the one or more frequency channels based on the information signal provided by the controller. Some embodiments comprise one or more integrated circuits comprising the apparatus. Some embodiments comprise an electronic communication device comprising the apparatus.

In general, in one aspect, an embodiment features a method comprising: selecting one of a plurality of frequency regions, wherein bandwidths of the frequency regions are non-uniform; transceiving, according to a first protocol, first wireless signals in the one of the plurality of the frequency regions; selecting one or more frequency channels based on the selected one of the plurality of the frequency regions; and transceiving, according to a second protocol, second wireless signals only in the one or more frequency channels.

Embodiments of the method can include one or more of the following features. In some embodiments, the first protocol is a Mobile Wireless Standards (MWS) protocol; and the second protocol is an Industrial, Scientific and Medical (ISM) band protocol. In some embodiments, the first protocol is an Industrial, Scientific and Medical (ISM) band protocol; and the second protocol is a Mobile Wireless Standards (MWS) protocol. In some embodiments, each of the first protocol and the second protocol is an Industrial, Scientific and Medical (ISM) band protocol. Some embodiments comprise selecting one of a plurality of frequency sub-regions, wherein one of the frequency regions includes the plurality of the frequency sub-regions; transceiving the first wireless signals in the one of the plurality of the frequency sub-regions; and selecting the one or more frequency channels based on the one of the plurality of the frequency sub-regions. Some embodiments comprise providing an information signal, wherein the information signal indicates the one of the plurality of the frequency regions; and selecting the one or more frequency channels based on the information signal.

In general, in one aspect, an embodiment features computer-readable media embodying instructions executable by a computer in an electronic device to perform functions comprising: selecting one of a plurality of frequency regions, wherein bandwidths of the frequency regions are non-uniform; causing the electronic device to transceive, according to a first protocol, first wireless signals in the one of the plurality of the frequency regions; selecting one or more frequency channels based on the one of the plurality of the frequency regions; and causing the electronic device to transceive, according to a second protocol, second wireless signals only in the one or more frequency channels.

Embodiments of the computer-readable media can include one or more of the following features. In some embodiments, the first protocol is a Mobile Wireless Standards (MWS) protocol; and the second protocol is an Industrial, Scientific and Medical (ISM) band protocol. In some embodiments, the first protocol is an Industrial, Scientific and Medical (ISM) band protocol; and the second protocol is a Mobile Wireless Standards (MWS) protocol. In some embodiments, each of the first protocol and the second protocol is an Industrial, Scientific and Medical (ISM) band protocol. In some embodiments, the functions further comprise: selecting one of a plurality of frequency sub-regions, wherein one of the frequency regions includes the plurality of the frequency sub-regions; transceiving the first wireless signals in the one of the plurality of the frequency sub-regions; and selecting the one or more frequency channels based on the one of the plurality of the frequency sub-regions. In some embodiments, the functions further comprise: providing an information signal, wherein the information signal indicates the selected one of the plurality of the frequency regions; and selecting the one or more frequency channels based on the information signal.

The details of one or more implementations are set forth in the accompanying drawings and the description below. Other features will be apparent from the description and drawings, and from the claims.

Figure 1:
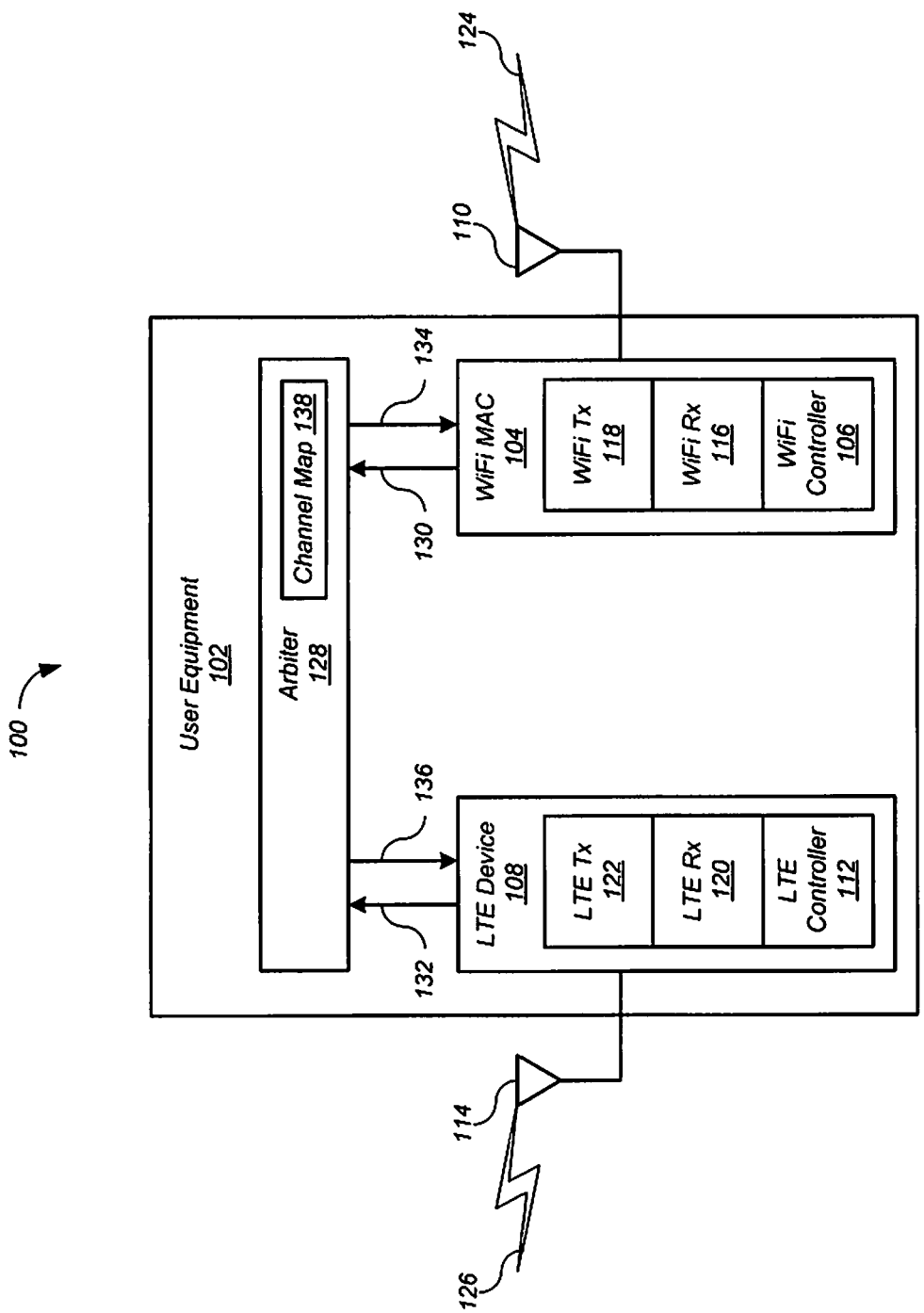
FIG. 1 shows elements of a communication system according to one embodiment.

The leading digit(s) of each reference numeral used in this specification indicates the number of the drawing in which the reference numeral first appears.

DETAILED DESCRIPTION

Embodiments of the present disclosure provide coexistence among multiple wireless communication technologies based on the frequency regions used by one or more of the wireless signals, where bandwidths of the frequency regions are non-uniform. In some cases, the wireless communication technologies use adjacent frequency bands, and so cause adjacent channel interference. For example, some bands used by Mobile Wireless Standards (MWS) technologies are adjacent to the Industrial, Scientific and Medical (ISM) frequency band. In other cases, the interference results from wireless communication technologies using frequency bands that partially or fully overlap. For example, both WiFi and Bluetooth use the ISM frequency band.

FIG. 1 shows elements of a communication system 100 according to one embodiment. Although in the described embodiments the elements of the communication system 100 are presented in one arrangement, other embodiments may feature other arrangements. For example, elements of the communication system 100 can be implemented in hardware, software, or combinations thereof.

Referring to FIG. 1, the communication system 100 includes a user equipment (UE) 102 capable of communications using multiple wireless technologies. The user equipment 102 can be implemented as any sort of electronic device capable of performing the functions described herein. For example, the user equipment 102 can be implemented as a smartphone, tablet computer, or the like. Elements of user equipment 102 can be implemented as one or more integrated circuits.

The user equipment 102 includes multiple transceivers employing different wireless technologies. In the example of FIG. 1, the transceivers include a Mobile Wireless Standards (MWS) transceiver and an Industrial, Scientific and Medical (ISM) band transceiver. In other embodiments, other numbers of transceivers and other combinations of wireless technologies can be employed instead. For example, the MWS transceivers can include Long Term Evolution (LTE) transceivers, Worldwide Interoperability for Microwave Access (WiMAX) transceivers, and the like, and the ISM band transceivers can include WiFi transceivers, Bluetooth transceivers, ZigBee transceivers, and the like. The transceivers can include two MWS transceivers or two ISM transceivers. The ISM band equipment can also include receive-only devices such as global positioning system (GPS) receivers, frequency modulation (FM) radio receivers, and the like.

In the example of FIG. 1, the transceivers include a WiFi media access controller (MAC) 104 and an LTE device 108. Each transceiver communicates using one or more respective antennas. In particular, the WiFi MAC 104 uses one or more antennas 110, and the LTE device 108 uses one or more antennas 114. In some embodiments, one or more of the antennas 110, 114 can be combined.

The WiFi MAC 104 includes a receiver (WiFi Rx) 116, a transmitter (WiFi Tx) 118, and a WiFi controller 106. The LTE device 108 includes a receiver (LTE Rx) 120, a transmitter (LTE Tx) 122, and an LTE controller 112. The WiFi MAC 104 uses antenna 110 to transmit and receive wireless WiFi protocol signals 124 (also referred to herein as WiFi signals 124). The LTE device 108 uses antenna 114 to transmit and receive wireless LTE protocol signals 126 (also referred to herein as LIE signals 126).

The user equipment 102 also includes an arbiter 128. The arbiter 128, the LTE controller 112, and the WiFi controller 106 can be implemented as one or more processors. Processors according to various embodiments can be fabricated as one or more integrated circuits. The arbiter 128 includes a channel map 138. The channel map 138 can be stored in an internal memory of the arbiter 128, in a memory external to the arbiter 128, or the like. The arbiter 128 receives information signals 130, 132 from the transceivers 104, 108, and provides control signals 134, 136 to the transceivers 104, 108. The arbiter 128 receives the information signals 130 from the WiFi MAC 104, and provides the control signals 134 to the WiFi MAC 104. The arbiter 128 receives the information signals 132 from the LTE device 108, and provides the control signals 136 to the LTE device 108. In some embodiments, not all of the information signals 130, 132 and control signals 134, 136 are used.

The information signals 130, 132 include indications of the frequency regions used by the wireless signals 124, 126, respectively. The indications of the frequency regions used by the wireless signals 124, 126 can include indications of the frequency regions used by the wireless signals 124, 126 received by the receivers 116, 120, indications of the frequency regions used by the wireless signals 124, 126 employed by the transmitters 118, 122 to transmit the wireless signals 124, 126, and the like. The frequency regions can include present frequency regions, as well as planned future frequency regions.

Figure 2:
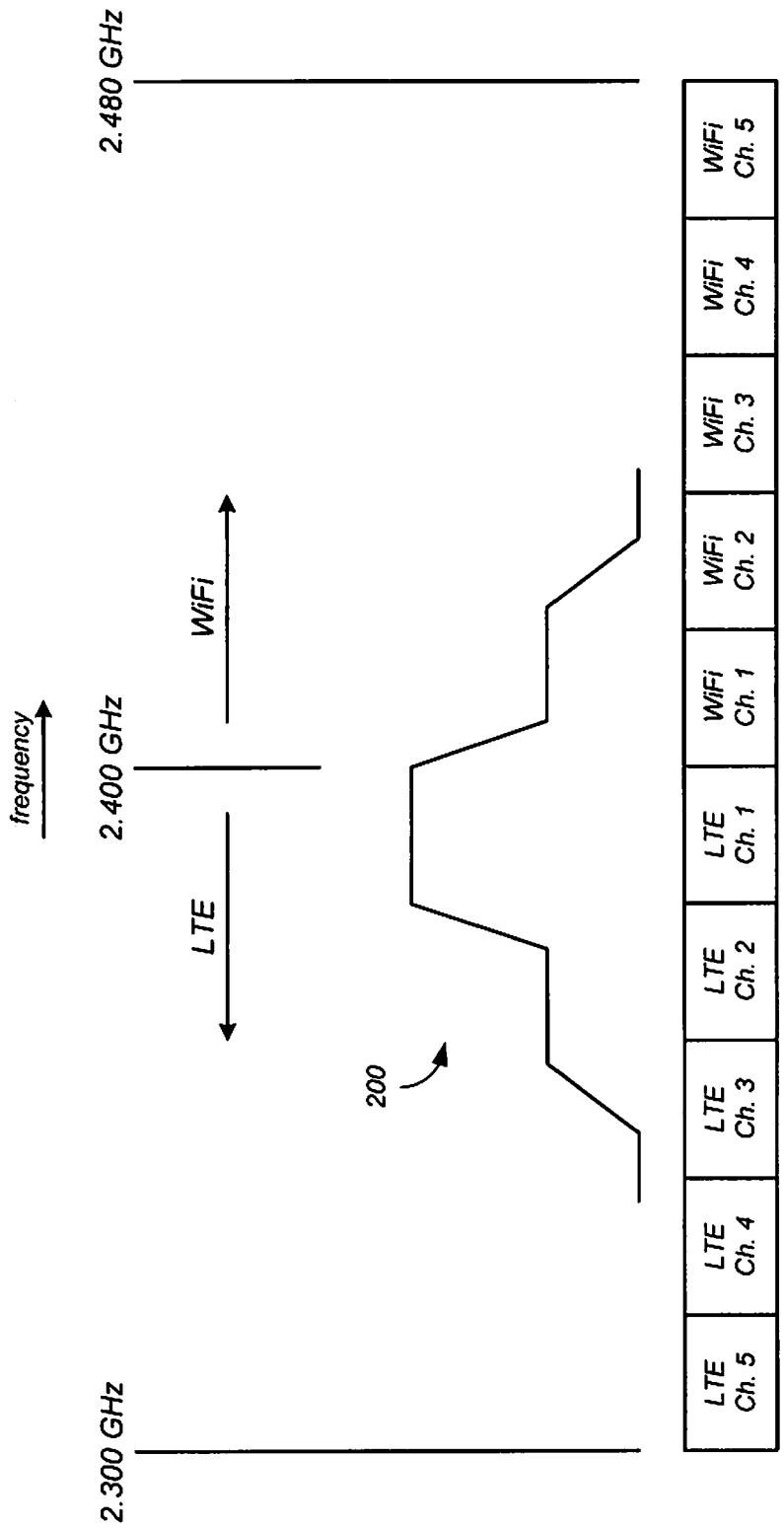
FIG. 2 illustrates graphically how different channels in one transceiver generate different levels of interference for different channels in the other transceiver.

In conventional approaches, the bandwidths of the indicated frequency regions are uniform. For example, the frequency range indication is uniformly distributed for all of the LTE channels. However, such conventional approaches fail to account for the fact that different channels in one transceiver generate different levels of interference for different channels in the other transceiver in the user equipment 102. FIG. 2 illustrates this fact graphically for LTE 20 MHz channels 1-5 and WiFi channels 1-5. Referring to FIG. 2, each LTE channel has a bandwidth of 20 MHz, and the LTE channel number increases with decreasing frequency. Each WiFi channel has a bandwidth of 22 MHz, and the WiFi channel number increases with increasing frequency. In terms of frequency, the closer an LTE channel is to a WiFi channel, the more interference a WiFi transmission will produce in that LTE channel. For example, in terms of frequency, WiFi channel 1 is much closer to LTE channel than to LTE channel 5. Therefore a WiFi transmission in channel 1 will produce more interference in LTE channel 1 than in LTE channel 5. The spectrum for LTE channel 1 is shown at 200, where the out-of-band emissions for LTE channel 1 are seen extending into WiFi channels 1 and 2.

Figure 3:
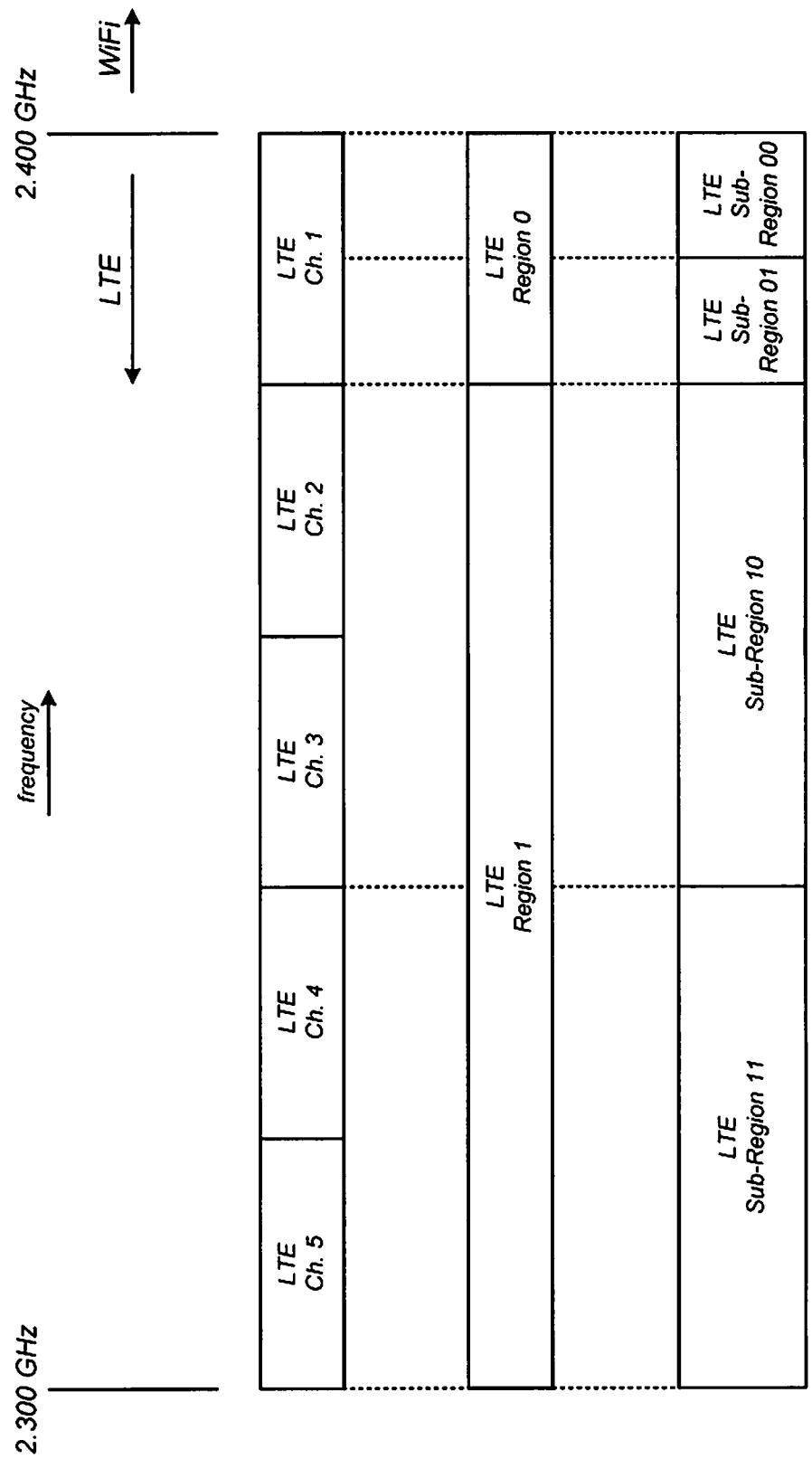
FIG. 3 shows an example mapping of LTE channels 1-5 into frequency regions and sub-regions having non-uniform bandwidths.

The described embodiments account for this fact by mapping the channels into frequency regions having non-uniform bandwidths. FIG. 3 shows an example mapping of LTE channels 1-5 into frequency regions having non-uniform bandwidths. Referring to FIG. 3, LTE channel 1 is mapped to LTE frequency region 0, while LTE channels 2-5 are mapped to LTE frequency region 1. In this mapping, the frequency regions have non-uniform bandwidths, with LTE frequency region 0 having a bandwidth of 20 MHz and LTE frequency region 1 having a bandwidth of 80 MHz.

In one embodiment, information signals 132 inform the arbiter 128 of the LTE frequency region employed by LTE device 108. Based on that LTE frequency region, the arbiter 128 selects one or more WiFi frequency channels available for use by the WiFi MAC 104, and informs the WiFi MAC 104 of the one or more available frequency channels using control signals 134. For example, the arbiter 128 employs the channel map 138 to select the one or more available WiFi frequency channels based on the LTE frequency region employed by the LTE device 108. An example mapping is shown in Table 1.

TABLE 1

| LTE frequency region | available WiFi frequency channels |
| --- | --- |
| 0 | 5-11 |
| 1 | 2-11 |

In some embodiments, the LTE frequency regions are divided into LTE frequency sub-regions having non-uniform bandwidths. FIG. 3 shows an example mapping of LTE channels 1-5 into LTE frequency sub-regions having non-uniform bandwidths. Referring to FIG. 3, LTE channel 1 is mapped to LTE frequency regions 00 and 01, LTE channels 2-3 are mapped to LTE frequency sub-region 10, and LTE channels 4-5 are mapped to LTE frequency sub-region 11. In this mapping, the frequency sub-regions have non-uniform bandwidths, with LTE frequency sub-regions 00 and 01 each having a bandwidth of 10 MHz and LTE frequency sub-regions 10 and 11 each having a bandwidth of 40 MHz.

In one embodiment, information signals 132 inform the arbiter 128 of the LTE frequency sub-region employed by LTE device 108. Based on that LTE frequency sub-region, the arbiter 128 selects one or more WiFi frequency channels available for use by the WiFi MAC 104, and informs the WiFi MAC 104 of the one or more available frequency channels using control signals 134. For example, the arbiter 128 employs the channel map 138 to select the one or more available WiFi frequency channels based on the LTE frequency sub-region employed by the LTE device 108. An example mapping is shown in Table 2.

TABLE 2

| LTE frequency sub-region | available WiFi frequency channels |
| --- | --- |
| 00 | 5-11 |
| 01 | 3-11 |
| 10 | 2-11 |
| 11 | 1-11 |

Similar mappings can be used for other sorts of transceivers. For example, in some embodiments, user equipment 102 includes a Bluetooth transceiver, and the arbiter 128 employs the channel map 138 to select the available Bluetooth frequency channels based on the LTE frequency sub-region employed by the LTE device 108. An example mapping is shown in Table 3.

TABLE 3

| LTE frequency sub-region | available Bluetooth frequency channels |
| --- | --- |
| 00 | 21-79 |
| 01 | 11-79 |
| 10 | 6-79 |
| 11 | 1-79 |

In some embodiments, the arbiter 128 uses the channel map 138 to assign channels to the WiFi MAC 104, as described above. In other embodiments, the arbiter 128 can assign channels to the WiFi MAC 104 in other ways, for example by using programmable thresholds or frequency offsets to give sufficient frequency gaps between the LTE and WiFi operating regions. It should be noted that the mappings, regions, and subregions of FIG. 3 and Tables 1-3 are shown by way of example. Other embodiments can feature other mappings, regions, and subregions.

Figure 4:
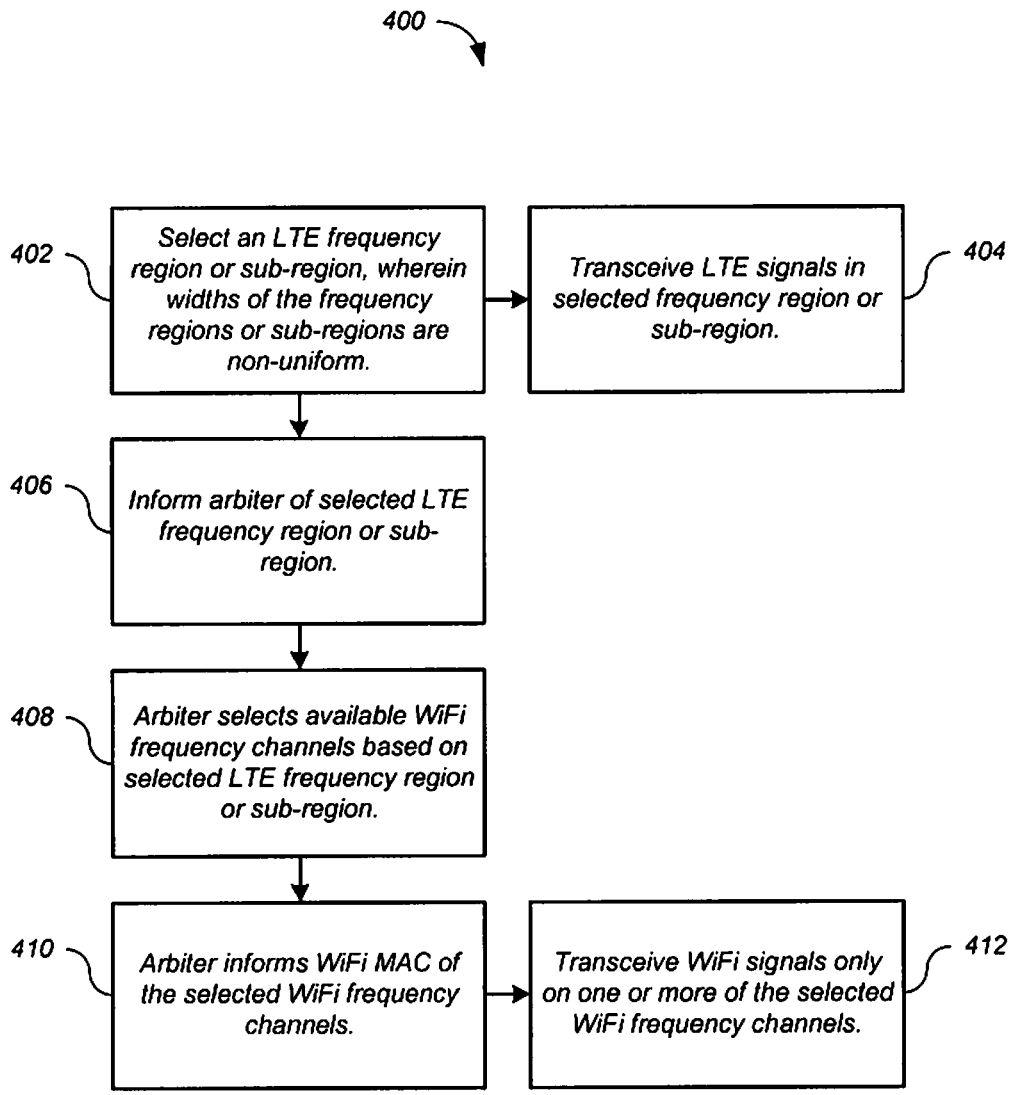
FIG. 4 shows a process for the user equipment of FIG. 1 according to an embodiment where the arbiter assigns WiFi channels to the WiFi MAC based on the LTE channels used by the LTE device.

FIG. 4 shows a process 400 for user equipment 102 of FIG. 1 according to an embodiment where the arbiter 128 assigns WiFi channels to the WiFi MAC 104 based on the LTE channels used by the LTE device 108. Although in the described embodiments the elements of process 400 are presented in one arrangement, other embodiments may feature other arrangements. For example, in various embodiments, some or all of the elements of process 400 can be executed in a different order, concurrently, and the like. Also some elements of process 400 may not be performed, and may not be executed immediately after each other. In addition, some or all of the elements of process 400 can be performed automatically, that is, without human intervention.

Referring to FIG. 4, at 402, the LTE controller 112 selects one of a plurality of LTE frequency regions or sub-regions, where bandwidths of the frequency regions or sub-regions are non-uniform. The LTE frequency region or sub-region can be assigned to the LTE device 108, for example, by a base station, also referred to as an LTE evolved Node B (eNB or eNodeB). Subsequently, at 404, the LTE device 108 transceives, according to the LTE protocol, wireless signals 126 in the selected frequency region or sub-region.

At 406, the LTE controller 112 informs the arbiter 128 of the selected LTE frequency region or sub-region. In particular, the LTE controller 112 provides the information signal 132, where the information signal 132 indicates the selected LTE frequency region or sub-region. For example, the information signal 132 can include the LTE frequency region or sub-region bits listed in Tables 1 and 2 above. At 408, in response to the information signal 132, the arbiter 128 selects available WiFi frequency channels based on the information signal 132, for example as described above. At 410, the arbiter 128 informs the WiFi MAC 104 of the selected WiFi frequency channels. In particular, the arbiter 128 provides the control signal 134, where the control signal 134 indicates the selected WiFi frequency channels. At 412, the WiFi MAC 104 then transceives the WiFi signals 124 on one or more of the selected WiFi frequency channels.

Figure 5:
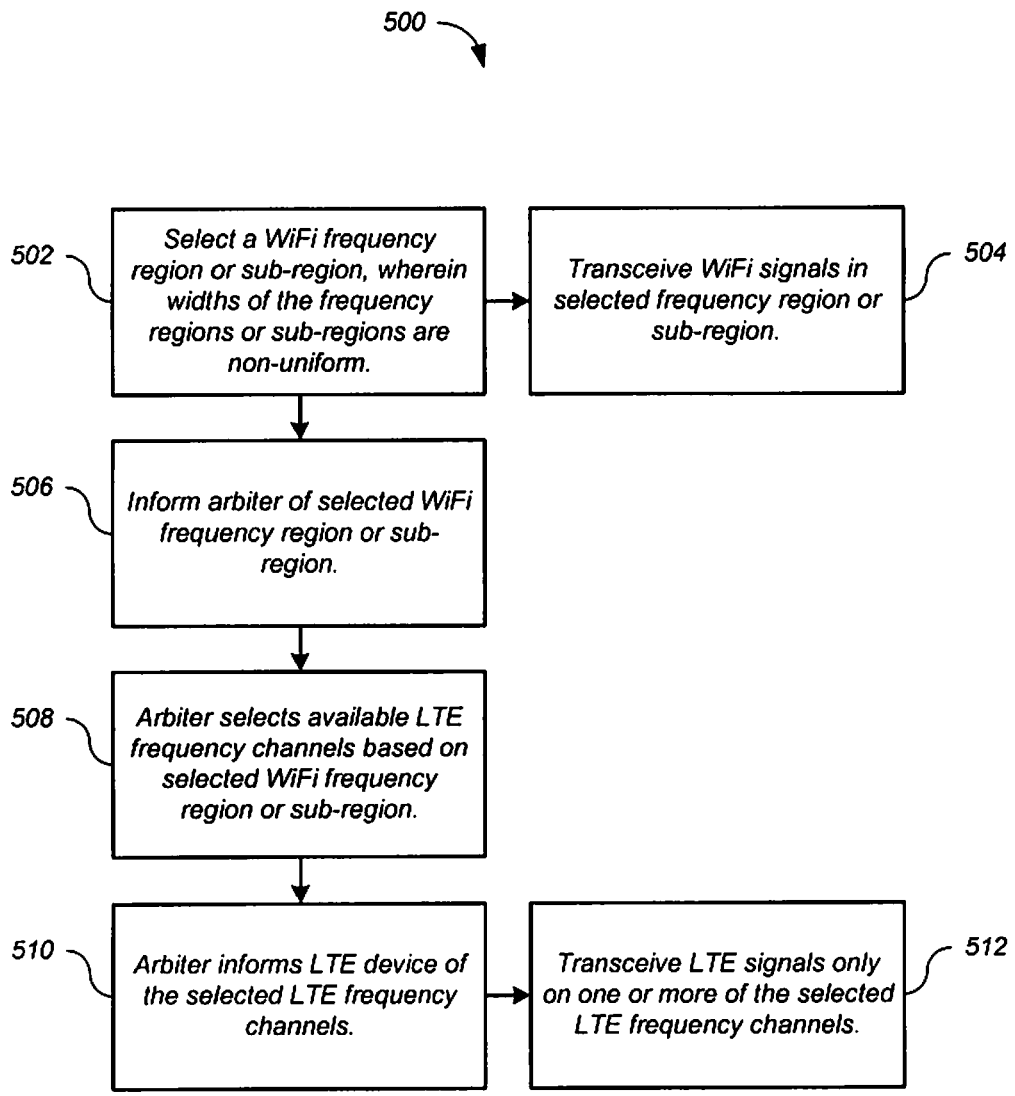
FIG. 5 shows a process for the user equipment of FIG. 1 according to an embodiment where the arbiter assigns LTE channels to the LTE device based on the WiFi channels used by the WiFi MAC.

The techniques described herein can also be used by the arbiter 128 to select available LTE channels based on the WiFi channel in use by the WiFi MAC 104. FIG. 5 shows a process 500 for user equipment 102 of FIG. 1 according to an embodiment where the arbiter 128 assigns LTE channels to the LTE device 108 based on the WiFi channels used by the WiFi MAC 104. Although in the described embodiments the elements of process 500 are presented in one arrangement, other embodiments may feature other arrangements. For example, in various embodiments, some or all of the elements of process 500 can be executed in a different order, concurrently, and the like. Also some elements of process 500 may not be performed, and may not be executed immediately after each other. In addition, some or all of the elements of process 500 can be performed automatically, that is, without human intervention.

Referring to FIG. 5, at 502, the WiFi controller 106 selects one of a plurality of WiFi frequency regions or sub-regions, where bandwidths of the frequency regions or sub-regions are non-uniform. The WiFi frequency regions or sub-regions can be mapped to WiFi channels in a manner similar to that shown for the LTE channels in FIG. 3. Subsequently, at 504, the WiFi MAC 104 transceives, according to the WiFi protocol, wireless signals 124 in the selected frequency region or sub-region.

At 506, the WiFi controller 106 informs the arbiter 128 of the selected WiFi frequency region or sub-region. In particular, the WiFi controller 106 provides the information signal 130, where the information signal 130 indicates the selected WiFi frequency region or sub-region. At 508, in response to the information signal 130, the arbiter 128 selects available LTE frequency channels based on the information signal 130, for example in a manner similar to that described above for the selection of available WiFi channels. At 510, the arbiter 128 informs the LTE device 108 of the selected LTE frequency channels. In particular, the arbiter 128 provides the control signal 136, where the control signal 136 indicates the selected LTE frequency channels. At 512, the LTE device 108 then transceives the LTE signals 126 on one or more of the selected LTE frequency channels.

Various embodiments feature one or more of the following advantages. From the viewpoint of an LTE base station, the downlink resource is saved from engaging in unsuccessful transactions resulting from potentially high interference with WiFi transmissions from the user equipment 102. Thus the downlink resource can be used for other user equipment 102 resulting in better resource utilization efficiency for the base station. From the viewpoint of WiFi devices in user equipment 102, the WiFi receive resource is saved from unsuccessful receive transactions resulting from potentially high interference with LTE uplink packets. Note these advantages are achieved without changing existing 3GPP LTE standards.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. An apparatus, comprising: a first transceiver comprising a controller, wherein the controller is configured to (i) map a first channel of a plurality of communication channels to a first frequency region of a plurality of frequency regions, wherein the plurality of communication channels and the plurality of frequency regions are in a same frequency band corresponding to a first protocol, and (ii) map two or more second channels of the plurality of communication channels to a second frequency region of the plurality of frequency regions, wherein the first frequency region includes a plurality of first frequency sub-regions such that the first channel mapped to the first frequency region includes each of the plurality of first frequency sub-regions, and wherein the second frequency region includes a plurality of second frequency sub-regions, the controller is configured to select one of the first frequency sub-regions from the first frequency region or one of the second frequency sub-regions from the second frequency region, the plurality of frequency regions are adjacent to each other, bandwidths of the frequency regions are non-uniform, the first transceiver is configured to transceive, according to the first protocol, first wireless signals in the first frequency sub-region or the second frequency sub-region selected by the controller, and the controller is configured to provide an information signal indicating which of the first frequency sub-regions or the second frequency sub-regions was selected by the controller; an arbiter configured to, based on the information signal indicating which of the first frequency sub-regions or the second frequency sub-regions was selected by the controller, select one of (i) a first group of frequency channels corresponding to a second protocol when a first one of the first frequency sub-regions is selected by the controller, (ii) a second group of frequency channels corresponding to the second protocol when a second one of the first frequency sub-regions is selected by the controller, and (iii) a third group of frequency channels corresponding to the second protocol when one of the second frequency sub-regions is selected by the controller, wherein a first number of frequency channels corresponding to the second protocol are not used when the first group of frequency channels are selected, wherein a second number of frequency channels corresponding to the second protocol are not used when the second group of frequency channels are selected, and wherein a third number of frequency channels corresponding to the second protocol are not used when the third group of frequency channels are selected; and a second transceiver configured to transceive, according to the second protocol, second wireless signals only in the first group, the second group, or the third group of frequency channels selected by the arbiter.

2. The apparatus of claim 1, wherein:
the first protocol is a Mobile Wireless Standards (MWS) protocol; and
the second protocol is an Industrial, Scientific and Medical (ISM) band protocol.

3. The apparatus of claim 1, wherein:
the first protocol is an Industrial, Scientific and Medical (ISM) band protocol; and
the second protocol is a Mobile Wireless Standards (MWS) protocol.

4. The apparatus of claim 1, wherein:
each of the first protocol and the second protocol is an Industrial, Scientific and Medical (ISM) band protocol.

5. One or more integrated circuits comprising the apparatus of claim 1.

6. An electronic communication device comprising the apparatus of claim 1.

7. The apparatus of claim 1, wherein the first group of frequency channels corresponding to the second protocol is closer to the frequency band corresponding to the first protocol than the second group of frequency channels corresponding to the second protocol.

8. The apparatus of claim 1, wherein (i) the first group of frequency channels corresponds to a first available group of frequency channels mapped to the first frequency sub-region and (ii) the second group of frequency channels corresponds to a second available group of frequency channels mapped to the second frequency sub-region, and wherein (iii) the first available group of frequency channels excludes the first number of frequency channels corresponding to the second protocol, and (iv) the second available group of frequency channels excludes the second number of frequency channels corresponding to the second protocol.

9. The apparatus of claim 1, wherein the first group of frequency channels and the second group of frequency channels overlap.

10. The apparatus of claim 1, wherein the second group of frequency channels includes a greater number of frequency channels available for selection than the first group of frequency channels.

11. A method, comprising: mapping a first channel of a plurality of communication channels to a first frequency region of a plurality of frequency regions, wherein the plurality of communication channels and the plurality of frequency regions are in a same frequency band corresponding to a first protocol, wherein the first frequency region includes a plurality of first frequency sub-regions such that the first channel mapped to the first frequency region includes each of the plurality of first frequency sub-regions; mapping two or more second channels of the plurality of communication channels to a second frequency region of the plurality of frequency regions, wherein the second frequency region includes a plurality of second frequency sub-regions; selecting one of the first frequency sub-regions from the first frequency region or one of the second frequency sub-regions from the second frequency region, wherein the plurality of frequency regions are adjacent to each other, and wherein bandwidths of the frequency regions are non-uniform; transceiving, according to the first protocol, first wireless signals in the first frequency sub-region or the second frequency sub-region as selected; providing an information signal indicating which of the first frequency sub-regions or the second frequency sub-regions was selected; based on the information signal indicating which of the first frequency sub-regions or the second frequency sub-regions was selected, selecting (i) a first group of frequency channels corresponding to a second protocol when a first one of the first frequency sub-regions is selected, (ii) a second group of frequency channels corresponding to the second protocol when a second one of the first frequency sub-regions is selected, and (iii) a third group of frequency channels corresponding to the second protocol when one of the second frequency sub-regions is selected, wherein a first number of frequency channels corresponding to the second protocol are not used when the first group of frequency channels are selected, wherein a second number of frequency channels corresponding to the second protocol are not used when the second group of frequency channels are selected, and wherein a third number of frequency channels corresponding to the second protocol are not used when the third group of frequency channels are selected; and transceiving, according to the second protocol, second wireless signals only in the selected first group, second group, or third group of the frequency channels.

12. The method of claim 11, wherein:
the first protocol is a Mobile Wireless Standards (MWS) protocol; and
the second protocol is an Industrial, Scientific and Medical (ISM) band protocol.

13. The method of claim 11, wherein:
the first protocol is an Industrial, Scientific and Medical (ISM) band protocol; and
the second protocol is a Mobile Wireless Standards (MWS) protocol.

14. The method of claim 11, wherein:
each of the first protocol and the second protocol is an Industrial, Scientific and Medical (ISM) band protocol.

15. Non-transitory computer-readable media embodying instructions executable by a computer in an electronic device to perform functions comprising: mapping a first channel of a plurality of communication channels to a first frequency region of a plurality of frequency regions, wherein the plurality of communication channels and the plurality of frequency regions are in a same frequency band corresponding to a first protocol, wherein the first frequency region includes a plurality of first frequency sub-regions such that the first channel mapped to the first frequency region includes each of the plurality of first frequency sub-regions; mapping two or more second channels of the plurality of communication channels to a second frequency region of the plurality of frequency regions, wherein the second frequency region includes a plurality of second frequency sub-regions; selecting one of the first frequency sub-regions from the first frequency region or one of the second frequency sub-regions from the second frequency region, wherein the plurality of frequency regions are adjacent to each other, and wherein bandwidths of the frequency regions are non-uniform; transceiving, according to the first protocol, first wireless signals in the first frequency sub-region or the second frequency sub-region as selected; providing an information signal indicating which of the first frequency sub-regions or the second frequency sub-regions was selected; based on the information signal indicating which of the first frequency sub-regions or the second frequency sub-regions was selected, selecting (i) a first group of frequency channels corresponding to a second protocol when a first one of the first frequency sub-regions is selected, (ii) a second group of frequency channels corresponding to the second protocol when a second one of the first frequency sub-regions is selected, and (iii) a third group of frequency channels corresponding to the second protocol when one of the second frequency sub-regions is selected, wherein a first number of frequency channels corresponding to the second protocol are not used when the first group of frequency channels are selected, wherein a second number of frequency channels corresponding to the second protocol are not used when the second group of frequency channels are selected, and wherein a third number of frequency channels corresponding to the second protocol are not used when the third group of frequency channels are selected; and transceiving, according to the second protocol, second wireless signals only in the selected first group, of second group, or third group of the frequency channels.

16. The non-transitory computer-readable media of claim 15, wherein:
the first protocol is a Mobile Wireless Standards (MWS) protocol; and
the second protocol is an Industrial, Scientific and Medical (ISM) band protocol.

17. The non-transitory computer-readable media of claim 15, wherein:
the first protocol is an Industrial, Scientific and Medical (ISM) band protocol; and
the second protocol is a Mobile Wireless Standards (MWS) protocol.

18. The non-transitory computer-readable media of claim 15, wherein:
each of the first protocol and the second protocol is an Industrial, Scientific and Medical (ISM) band protocol.

* * * * *